April 2, 1957  A. R. C. MARKL  2,787,050
METHOD OF MANUFACTURING BRANCHED FITTINGS
Original Filed Feb. 8, 1947  3 Sheets-Sheet 1

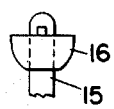

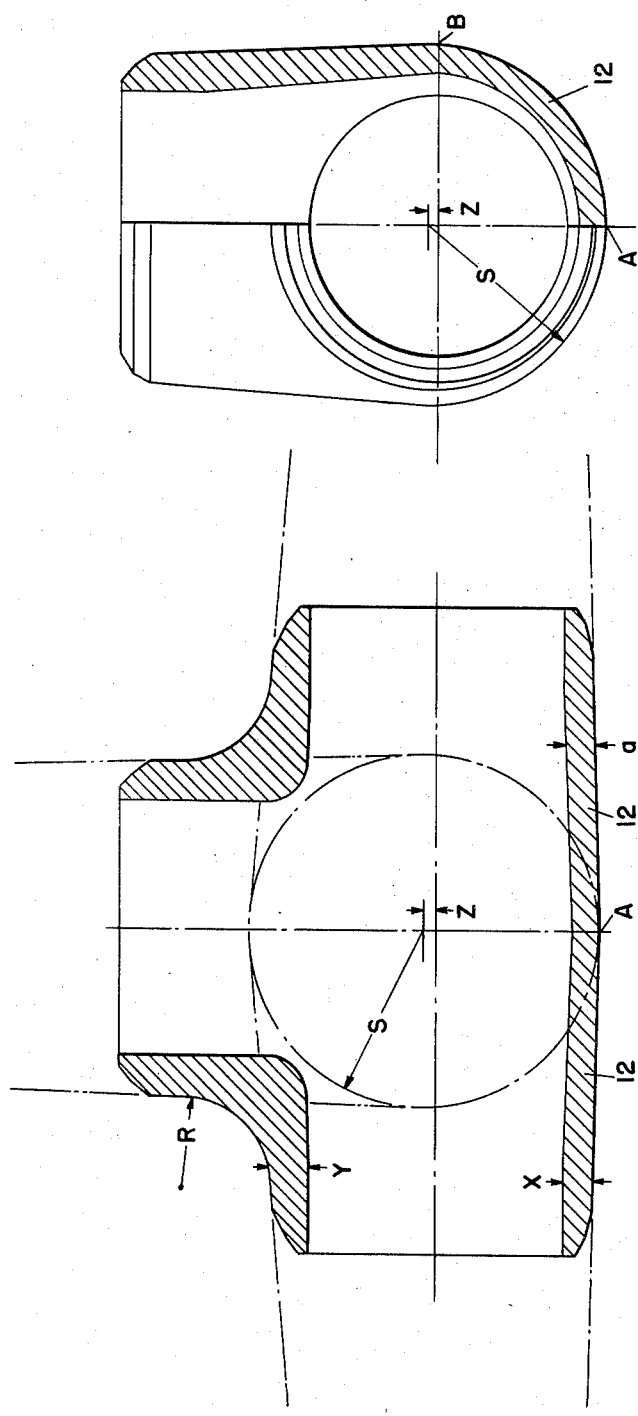

April 2, 1957 A. R. C. MARKL 2,787,050
METHOD OF MANUFACTURING BRANCHED FITTINGS
Original Filed Feb. 8, 1947 3 Sheets-Sheet 3

United States Patent Office 2,787,050
Patented Apr. 2, 1957

2,787,050
METHOD OF MANUFACTURING BRANCHED FITTINGS

Arthur R. C. Markl, Louisville, Ky., assignor, by mesne assignments, to National Cylinder Gas Company, Chicago, Ill., a Delaware corporation Original application February 8, 1947, Serial No. 727,412, now Patent No. 2,670,224, dated February 23, 1954. Divided and this application May 19, 1953, Serial No. 356,029

5 Claims. (Cl. 29—157)

This invention relates to the methods for manufacturing branched fittings such as T's, crosses, laterals and the like.

In the art of manufacturing pipe fittings, and particularly seamless welding fittings, the characteristics of the fitting have usually deviated from the optimum relationship of shape, size, weight, strength and flow conditions as a result of manufacturing limitations. In the case of fittings such as T's, crosses, Y's and laterals, having branch outlets made by drawing operations, it has been the practice heretofore to make the fittings unduly strong and heavy in some regions in order to insure sufficient strength at various critical regions, for example at the crotch of the neck or outlet. In the case of drawn seamless T's, especially, this practice is believed to have been due largely to the fact that in its manufacturing concept the art has adopted as a compromise the primitive shape defined by two intersecting right circular cylinders, since thereby a simpler manufacturing process could be used. Further manufacturing limitations are present in the case of fittings made by casting processes wherein it has been necessary to make the smaller sized fittings with wall thicknesses of disproportionately large size because of the requirements of the sand casting process. Even in the larger sized cast fittings, excessively heavy walls are customarily present because of metal porosity and the danger of core shifts during the casting operation.

Although various attempts have been made to provide fittings having wall thicknesses reinforced at selected points, as for example in the T shown by Olsen Patent 1,255,562 or the flow head shown by Reed Patent 1,989,608 or the bulged-out central portion of the T shown by Higgins Patent 977,740, nevertheless in each case the limitations of manufacture have resulted in articles having an excess of metal in some areas in order to insure the required strength in other areas.

An important object of the present invention, therefore, is the provision of methods for shaping fittings with controlled flow of metal for greater yield and bursting strengths in proportion to the weights of the fittings than has been previously attained.

More particularly, it is an object of the invention to provide, in the design and construction of branched fittings, improved configuration and improved distribution of material so that the theoretical optimum requirements for maximum strength with minimum weight of the fitting are closely approached.

In contrast with the less satisfactory compromise designs, especially the rough concept of intersecting right circular cylinders as heretofore generally employed in the construction of branched fittings, this invention provides as an important feature a branched fitting of spheroconical external form whose central body portion partakes of the shape of a sphere and whose outlets are generally in the form of truncated cones, and which fitting has a wall thickness ranging from a maximum in the region of the crotches where the branch outlet joins the main body to a minimum at points along the extremities of the outlets. A sphere has approximately twice the bursting strength of a cylinder having the same external diameter and the same wall thickness and it has been found that a conventional fitting when subjected to extremely high hydrostatic pressures actually tends to bulge out into a deformed spherical shape at its central portion. Hence in the practice of the present invention, the branched fitting initially is designed to have a shape closely approximating that which it can be expected to assume under conditions of extreme pressure use and then it is deliberately manufactured to that shape. The demands thereafter imposed upon the ductility of the material of the fitting during the first pressuring of the same when it is placed in use and during subsequent repressuring during its life are greatly reduced over the demands imposed on conventional fittings. Not only will the life of such improved fittings be longer, but also they can withstand greater peak pressures. Also in cases where vibration, unusual temperature changes, or corrosive fluids are encountered in use, these fittings are found to resist metal fatigue much better than the older types. Thus, by the present invention there is provided a fitting which not only has maximum strength with minimum weight, but also has a higher degree of safety and longer trouble-free service than fittings heretofore known to the art. Moreover, by following the teachings of the present invention, the fitting designer is afforded greater freedom and latitude of design while still meeting manufacturing process limitations.

Accordingly, another important object is to provide an improved method for drawing from tubular members branch fittings having the above-described improved configuration and metal distribution.

This invention provides improved methods and structure by means of which the outer ends of a tubular member are initially engaged with progressive engagement toward the central portion to produce and guide the flow of upset stock material toward the central recesses and into the regions of the crotches. In a preferred form of the invention the structure is in the form of relatively movable spaced dies having conically shaped recesses which produce a barrel shape, i. e., two circular cones which meet at the center of the fitting in the regions of their larger cross-sectional areas.

The present application is a division of parent application Serial No. 727,412, filed February 8, 1947, now Patent No. 2,670,224, dated February 23, 1954, filed as a result of a requirement for division made by the Patent Office in said parent application.

Other objects and advantages will become more apparent in the following detailed description when considered in connection with the accompanying drawings in which:

Fig. 14 is a sectional view on a larger scale showing a finished straight T illustrating the geometrical configurations thereof in greater detail;

Fig. 15 is an end view partly in section showing the configuration of the T shown in Fig. 14.

Figure 1:
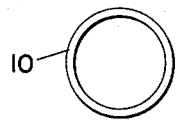
Figs. 1 and 2 are end and side views respectively of a section of tubular stock suitable for the manufacture of fittings in accordance with the invention.
Figure 2:
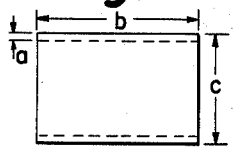

As one example of the invention, a tube section 10, such as shown in Figs. 1 and 2, may be converted into an improved straight T, such as shown in Figs. 14 and 15. However, the present invention is not limited to the process and structure for producing a single article, but on the contrary, may readily be applied to the manufacture of improved crosses, Y's, laterals and other branched fittings.

Referring first to Figs. 14 and 15, certain distinctive features of the finished fitting will be noted. Each outlet has an external wall of conical shape, the importance of which will later be described in connection with the operation of the dies in forming the product. These conical external walls, if extended, preferably become tangent to a generating sphere, having a radius S, diagrammatically indicated in Fig. 14. The central external body portion of the fitting partakes of the form of that sphere, as best shown in Fig. 15. Moreover, in fittings in which a single outlet extends to one side, as in T's or laterals, the center of the sphere is offset from the center line of the bore of the run of the fitting. With the center of the sphere thus offset, as by a distance Z, it is geometrically possible to form the end walls of the run as truncated cones the circular outer wall of which is eccentric to the circular inner wall measured on planes transverse to the axis of the run. In this construction the outer walls form a greater angle with the bore of the run on the side nearer the branch outlet than is formed therewith on the back side of the fitting. This results in the thickness of the wall in a plane near the end of the run increasing from a minimum X on the back wall to a maximum Y at the wall adjacent the outlet side, as best shown in Fig. 14. As will be noted, a comparatively heavy section of metal therefore is provided at the crotches at the junction of the branch outlet and run of the fitting to strengthen the regions of the crotches where rupture of prior art fittings has frequently occurred. A much greater bending moment measured in the plane of the axes of the branch outlet and run can thus be safely withstood. Due to the movement of excess metal into the region of the crotches, during the manufacturing process adequate metal is available to permit a comparatively large external radius R for the crotches adjacent the outlet. This is also a highly desirable manufacturing feature since the metal flowing into the crotches at or adjacent the branch outlet is in effect bent or laid around a large radius as it changes direction of flow. Not only are smaller pressures required by the dies but also the grain structure of the metal is improved by its comparatively smooth flow.

The degree to which such excess metal may be moved into a side of the fitting may be varied as desired by increasing or decreasing the value Z by which the center of the generating sphere is offset from the center line of the bore of the run of the fitting. Merely as an example, in the manufacture of six inch nominal pipe size straight T's, of the type shown in Figs. 14 and 15 and in six by six by four inch nominal pipe size reducing T's of the type shown in Figs. 16 and 17, a dimension Z of 0.169 inch will give satisfactory results.

Figure 16:
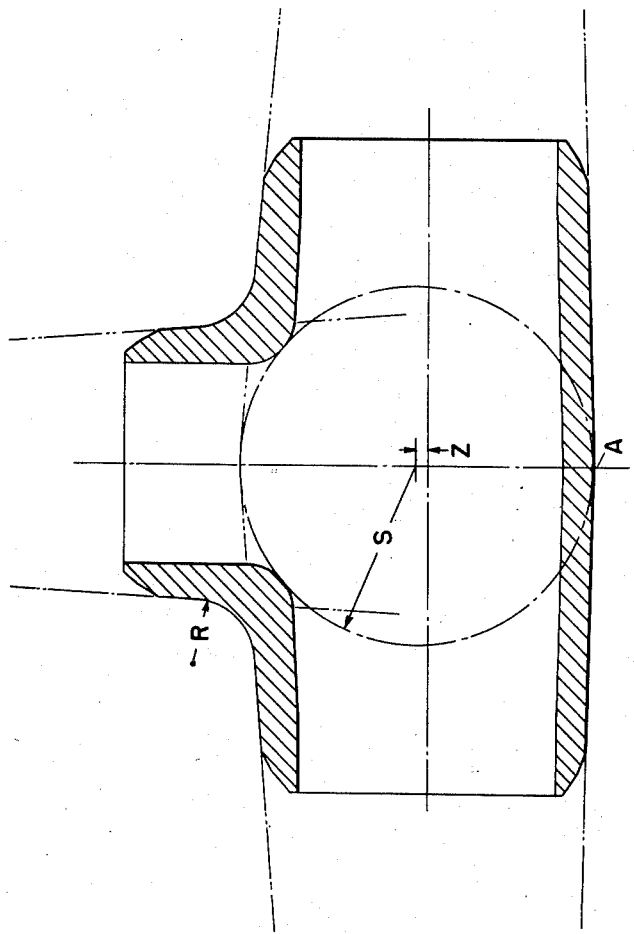

In contrast with the non-uniform wall thicknesses of the run portions measured in planes normal to the axis of the run of the fitting, a uniform wall thickness measured in like planes transverse to the axis of the branch is provided for the branch outlet of the illustrated fitting. In effect the external walls of the branch outlet or outlets for T's as well as crosses, are formed by right circular cones, which in the case of straight T's or crosses preferably are tangent to the generating sphere, as diagrammatically indicated on Fig. 14, but which in the case of reducing T's and crosses are not tangent, as indicated in Fig. 16. In view of these features and despite the fact that relatively little of the true spherical outer surface is readily apparent in the finally produced fitting it is felt that the term, sphero-conically generated fitting, most clearly defines the basic structure of the invention. As shown in the drawings, the sphero-conically generated fitting, made from a section of pipe such as shown in Figs. 1–6, in the formed fitting (both prior to Fig. 12, and after finishing, Figs. 14 and 16) has a run portion of barrel-like shape. The exterior wall of the run portion has a shape such that the radii of the curvature of its outside surface progressively decreases toward the extremities from a maximum midway of the fitting. Stated differently, the exterior of the surface of the run portion is generally in the shape of two circular cones meeting at the center of the fitting in the regions respectively of their larger cross-sectional areas. The interior walls of the run portions are generally in the form of two coaxial truncated right circular cones with the larger ends of the cones also located centrally of the fitting, which is to say the larger ends of the cones converge midway of the fitting. Thus, the interior of the run portions is also of generally barrel-like shape.

As a result of these considerations, it now becomes possible by conventional manufacturing processes, as for example those shown in Hodapp et al. Patent 2,290,965, to place the optimum amount of material of the stock employed at the locations where it will most efficiently be used during the service of the fitting.

Furthermore, various modifications of the thickness of the back wall of the fitting may be obtained by the use of selective heating or cooling, or both, in conjunction with the action of the dies in forming of the fitting. For example, in Figs. 14 and 15, whereas the fitting normally would tend to decrease in back wall thickness longitudinally from point A to the extremities of the run and to increase in wall thickness from point A circumferentially to point B as a result of the manufacturing process now to be described, this tendency may be modified as desired by control of the temperature of the metal without departing from the invention.

Figure 3:
Figs. 3 and 4 are end and side views respectively of the section of stock following the first stage of treatment.
Figure 4:
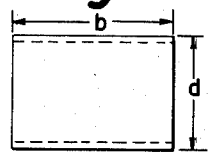
Figure 5:
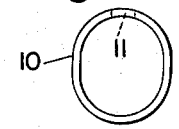
Figs. 5 and 6 are end and side views respectively of the section of stock with an aperture formed therein at a desired location for the manufacture of a T.
Figure 6:

Assuming that an improved seamless, straight welding T is to be made by a drawing operation using tubular stock with an outer diameter greater than the outer diameter of the ends of the T to be produced, a suitable section of stock 10, shown in Figs. 1 and 2, is provided. This stock, with an internal periphery greater than that of the final fitting and with an initial wall thickness $a$, outer diameter $c$ and length $b$, is then ovalized, i. e., formed by any suitable method, either hot or cold, into a generally oval shape as shown in Figs. 3 and 4, having a long transverse axis $d$, i. e., its major axis, and a short transverse axis $e$, i. e., its minor axis. After the axes are thus established, a suitable aperture 11 is formed in the wall of the section at one end of the long axis and at the location desired for the branch outlet, as indicated in Figs. 5 and 6, thus assuring that the aperture will be properly located with respect to later cooperation of said section with the forming dies.

Figure 7:
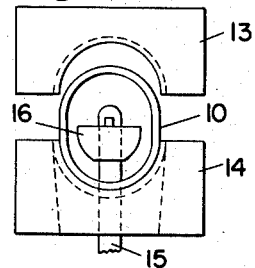
Figs. 7 and 8 are end and side views respectively showing the section of stock positioned within cooperating dies prior to the initial deforming step and indicating the relative position of the draw rod and expanding means later to be employed.
Figure 8:
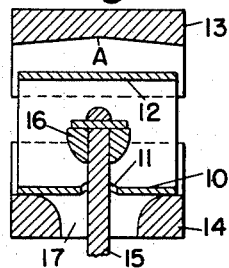

Depending upon the nature of the material forming the tube section, the thickness of the wall $a$ and the characteristics desired in the final fitting, such section may be processed hot or cold, or heated or cooled in selected areas, at the time the forming operations are conducted. For example, if a metal T of standard wall thickness, such as shown in Figs. 14 and 15, is desired, the back wall of the section may be processed cooler than the remainder of the section. The section then is placed between cooperating dies 13 and 14 as shown in Figs. 7 and 8, and prior to or after partial or full closing of the dies, a draw rod 15 is inserted through the aperture 11 in the section and an expanding means 16 is securely affixed to said rod. As will be noted from Fig. 8, the upper inner wall of die 13 which is to form back wall 12 of the fitting is sloped to provide the desired conical angles extending outwardly and circumferentially from point A. Similarly the lower inner wall of die 14 is sloped to form complementary conical angles outwardly and circumferentially as shown by the arcuate broken lines in Fig. 7.

With the section in position in the dies, the dies then are brought together whereupon several significant changes in the disposition of metal of the section occur. Of particular importance is the action of the inclined frusto-conical blank-engaging surfaces of the dies used for forming the external walls at the ends of the run. These conical surfaces provide more open space for metal to flow toward the central body portion and branch outlet area, and simultaneously restrain, without completely trapping, metal tending to flow toward the ends of the run. A smooth and easily controlled metal flow with an improved grain structure of the metal and without application of excessive pressures or danger of folding of metal into the unsupported interior of the section thus results. The outer ends of the oval section are the first regions of the section to be reformed into a circular shape by the dies and since the original outer diameter $c$ of the section is reduced to a smaller outer diameter $f$ in the final fitting, the resulting excess metal is progressively moved primarily into the region around the aperture 11 of the section and the outlet 17 in the lower die 14. Depending upon the relative temperatures of the several portions of the section used in cooperation with the metal flow normally induced by the action of the dies, metal may also be placed, as desired, circumferentially of the fitting in order to make a greater wall thickness, Fig. 15, at point B on the side than at point A on the back wall or to make the same wall thickness at these two points. Moreover, if a mere bending action of the back wall of the section is desired so as to provide a uniform back wall thickness of the same amount $a$ as the original section, as shown in Figs. 2 and 14, a sufficient chilling of the portion of a heated section along its back wall will produce a bending rather than upsetting action thereon during the closing of the dies. With sufficient chilling of the entire back half of a heated section, the wall thickness at point B can be maintained the same as at point A, if this be desired, thus providing even more excess metal for strengthening of the branch outlet region.

Figure 9:
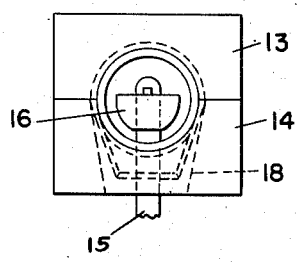
Figs. 9 and 10 are end and side views respectively showing the section of stock within the dies following the closing of the dies and prior to the drawing operation.
Figure 10:
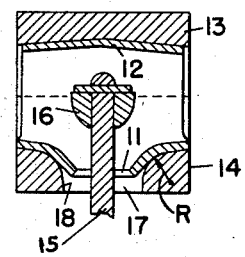

Referring now to Figs. 9 and 10, as the dies close, the small aperture 11 of the section 10 is stretched into an appreciably larger aperture suitable for expansion by the expanding means 16. Meanwhile the extremities of the run of the fitting have been formed and the metal required for the thickened crotch of large radius R (established by the die 14) has been moved into position for the final forming operation.

Figure 11:
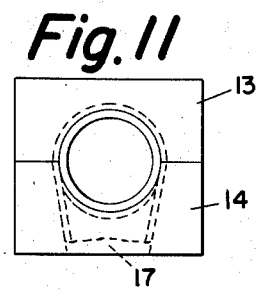
Figs. 11 and 12 are end and side views respectively showing the relative positions of the dies, a rough T formed therein, and the draw rod and expanding means following the drawing operation.
Figure 12:
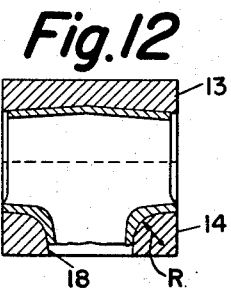

After the dies 13 and 14 both engage the tubular blank, expanding means 16 is drawn outwardly through frusto-conical blank-engaging die surfaces forming outlet 17 in die 14, as shown in Figs. 11 and 12, thus forming the branch of the T. During this movement the aperture 11 in the original section is further expanded and the excess metal which had been moved into the region near outlet 17 is bent and pulled downwardly and laid against the conical surface 18 in lower die 14. Thereupon dies 13 and 14 are opened and the rough fitting, one-half of which is shown in Fig. 13, is removed for finishing operations.

The rough fitting thus formed will have generally a short, thick wall section $g$ extending axially outwardly on each extremity of the run and located on the side having the thicker wall. The branch outlet, however, will usually taper to a narrower wall thickness and the outlet extremity will present a jagged peripheral configuration. The interior wall at the ends of the run of the fitting will exhibit a definite conical shape similar to the conical shape of the exterior wall, while the interior wall of the branch outlet, formed by the movement of expanding means 16, will be cylindrical and the exterior wall thereof will be conical. However, the wall thickness of such outlet, measured on a plane normal to the axis of the outlet, will be substantially uniform.

Figure 13:
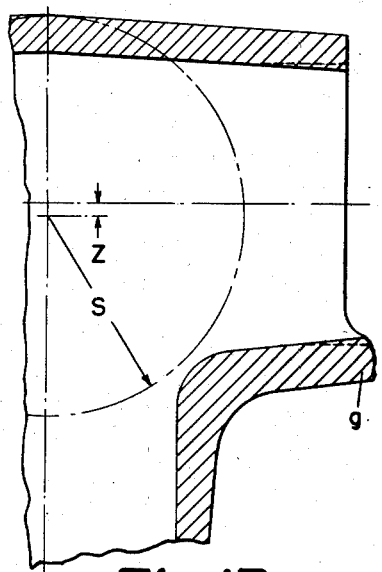
Fig. 13 is a sectional view on a larger scale showing one-half of the rough T prior to finishing operations.

In finishing the above described rough fitting to produce the fitting shown in Fig. 14, a boring axis is established which as shown in Fig. 13 will pass a distance Z above the center of the generating sphere S. A suitable boring tool then is inserted in each end of the run of the fitting to remove metal to the desired degree, as indicated by the horizontal broken lines shown in the metal section. In contrast with past manufacturing operations in which the boring tool frequently removed metal through a substantial length of the run of the fitting, it is necessary in the present invention to move the tool only to the point where the inner diameter of the conical walls becomes equal to the diameter of the bore being established. A substantial saving in scrap metal and operating time is thus achieved.

After the boring of the run is completed the rough fitting is then measured, marked and machined to produce an article having the desired lands and bevels suitable for welding to piping as for example the finished article of Figs. 14 and 15. It will be observed from Figs. 14 and 15 that with the center for the two circles spaced a distance Z from the axis of the bore the circle with radius S of Fig. 15 defines a substantial portion of the external surface of the fitting in the region of meeting of the two conical run portions. The distribution of metal in the fitting and its shape give rise to another characteristic particularly well illustrated in Fig. 14. As earlier pointed out in connection with Fig. 8, the upper, inner wall of die 13 which forms the back wall 12 of the fitting is sloped to provide the desired conical shapes extending outwardly, and circumferentially, from the region of point A. It has further been specified that the outer wall on the branch side of the fitting extends at a greater angle with the bore of the run than is formed on the back side thereof. The difference is made apparent in Fig. 14 by the broken lines and thus establishes, for the two conical shapes forming the run portions, axes of revolution which meet at the center for radii S of Fig. 14 and are inclined toward the center line of the bore through the run portions.

By means of the invention, sphere-conically generated fittings having advantages not heretofore obtainable are now made possible. Comparative tests conducted upon representative six inch seamless metal T's taken from commercial stocks indicate that the invention gives an increase of 16% or more in bursting strength for T's of equal weight. At the same time the tests show an increase of 22% or more in pressures withstood before evidence of yielding is noted. Moreover, it is found that the cyclically reversed bending moment which can be transmitted through the branch to the run is about 19% greater. Conversely, for equal bending moments, the fitting will withstand a greater number of stress reversals than conventional designs.

These fittings can be made from stock of any desired schedule of wall thicknesses, and, in the case of T's, uniform center to face dimensions can be secured as desired. Whenever required, the sides of the central body of the fitting can be given increased wall thickness merely by selective application of differential temperatures in the tube section being employed as stock.

Figure 17:
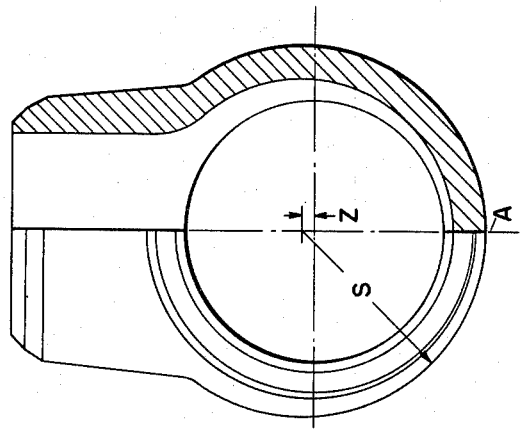
Figs. 16 and 17 are sectional side and end views respectively showing on a larger scale a finished reducing T made in accordance with the invention.

Although I have disclosed as representative of the invention the manufacture of a straight T, it will be obvious that reducing outlet T's, and both full size and reducing outlet crosses, Y's and laterals may be made by the use of appropriate dies and without departing from my invention. Such a reducing T is shown in Figs. 16 and 17 and may be made by the process steps as outlined in the production of the straight T, using dies however which are proportioned to the reducing T dimensions.

What is claimed is:

1. The method of making a fitting having two run portions and a laterally extending branch outlet intermediate the ends thereof from an ovalized tubular metal blank having an internal periphery greater than that of the final fitting which comprises providing at a temperature at which metal thereof will flow under the applied pressure a longitudinally extending portion of said tubular blank of circumferential extent at least as great as the external diameter of said branch outlet to be formed, applying metal shaping pressures to said blank by closing upon said blank along its major axis cooperating die members having an opening for said branch outlet, said die members when closed having opposed substantially frusto-conical blank-engaging surfaces with their larger diameter portions in proximity, whereby as said dies are closed upon said blank there is a thickening of the metal in said longitudinally extending portion as said periphery of said blank is being reduced, and there is induced flow of metal along said longitudinally extending portion from opposite ends toward the central portion thereof to produce at said central portion a region of maximum thickness, and moving through said region of maximum thickness and through said opening an outlet shaping means to form said branch outlet.

2. The method of claim 1, in which said opening in said dies for said branch outlet is of frusto-conical shape with the larger diameter end thereof merging with said frusto-conical blank-engaging die surfaces in the regions of their larger diameters, whereby as said outlet shaping means is moved through said opening, there is minimized a thinning of the metal in the region of said larger diameter end of said frusto-conical branch opening as the exterior wall of the branch outlet is conformed to said frusto-conical shape.

3. The method of claim 1, including the step of boring the run portions of the formed blank from their extremities inwardly to a depth where the internal diameter becomes equal to the diameter at the bore being established.

4. The method of claim 3, in which said boring of each of said extremities of said run portions is along a boring axis displaced in a direction toward the side of the formed blank opposite said outlet from the axis of the frusto-conical end portions of the formed blank.

5. The method of claim 1 in which said metal shaping pressures developed upon closure of said die members are applied through frusto-conical blank-engaging surfaces whose axes of revolution are respectively inclined toward a center line passing through the centers of the smaller diameter openings of said opposed surfaces and which axes meet at a point offset in the direction of said branch outlet opening from said center line, whereby increased thickening of the wall of said blank occurs on the branch outlet side of said blank and in the region of said branch outlet opening.

References Cited in the file of this patent

UNITED STATES PATENTS

| | | |
|---|---|---|
| 653,279 | Barthels | July 10, 1900 |
| 1,921,584 | Robinson | Aug. 8, 1933 |
| 2,240,319 | Taylor | Apr. 29, 1941 |
| 2,290,965 | Hodapp | July 28, 1942 |
| 2,292,799 | Romann | Aug. 11, 1942 |
| 2,507,859 | Keller | May 16, 1950 |

FOREIGN PATENTS

| | | |
|---|---|---|
| 171,780 | Germany | May 15, 1904 |